Feb. 17, 1970  H. S. McLIMORE  3,495,919

TURBINE BRAKE

Filed May 20, 1968

INVENTOR.
Henry S. McLimore
BY
Paul Fitzpatrick
ATTORNEY 3,495,919
TURBINE BRAKE
Henry S. McLimore, Indianapolis, Ind., assignor to General Motors Corporation, Detroit, Mich., a corporation of Delaware
Filed May 20, 1968, Ser. No. 730,400
Int. Cl. F01d 17/00, 7/00, 21/00
U.S. Cl. 415—18                                       7 Claims

ABSTRACT OF THE DISCLOSURE

A turbine includes an overspeed brake including a rotating brake drum connected to the turbine wheel by face splines and connected to the turbine power output shaft by inclined spokes. A fixed brake drum is disposed immediately outside the rotating brake. The diameter of the rotating brake drum is a function of speed and torque and, upon loss of load or critical overspeed of the turbine, its expansion will be such as to engage the brake and slow the rotation of the turbine to prevent bursting of the turbine wheel.

---

The invention herein described was made in the course of work under a contract or subcontract thereunder with the Department of Defense.

My invention is directed to brakes to prevent overspeed of rotating machinery and particularly to brakes for turbines, which are more subject to destructive overspeed than engines of some other types. More specifically, my invention is directed to a brake which is responsive both to speed of the turbine and to the torque delivered by it so that application of the brake is promoted by loss of load on the turbine in addition to the effects of centrifugal force developed by overspeed of the turbine after loss of the load.

By way of background to the detailed description of the preferred embodiment of my invention, it may be pointed out that in general turbines such as gas turbines, steam turbines, and some water wheels rotate at quite high speed in normal operation and that they are capable of extremely rapid increase in speed to destructive values in event of loss of load. The reason for this is that centrifugal force increases with the square of speed. A doubling of the speed of the turbine will increase the burst force on the disk by a factor of four. As a practical matter, many turbines cannot be designed with such margins of safety as to allow them to run at the speed they will attain upon loss of load.

This problem has long been recognized, and there have been many proposals for emergency brakes, governor trips, and other safety devices to brake a turbine upon loss of load or overspeed, or to interrupt immediately the supply of motive fluid.

Haworth U.S. Patent No. 2,930,188 for "Gas-turbine with Failure-Operated Control Means," issued Mar. 29, 1960, and Luedemann et al. U.S. Patent No. 3,159,166 for "Engine Safety Control," Dec. 1, 1964, both describe devices for interrupting the supply of fuel to a gas turbine upon loss of the load to which the turbine is coupled. U.S. Patents No. 1,600,346 to MacMurchy for "Turbine Overspeed Device," Sept. 21, 1926; No. 2,962,257 to Allingham for "Turbine Overspeed Controls," Nov. 29, 1960; and No. 3,271,005 to Jones for "Mechanical Overspeed Prevention Device," Sept. 6, 1966, show brakes which are engaged by centrifugal force upon overspeed of a turbine wheel.

My invention is directed to the provision of a very simple structure which responds both to speed and torque and which will be immediately effective to brake a turbine upon loss of load or hazardous overspeed.

The principal objects of my invention are to safeguard turbines against destructive overspeed and thereby prevent bursting of turbine wheels due to overspeed; to eliminate the need for heavy turbine casings to contain the fragments of a turbine wheel upon bursting thereof; and to provide a simple, effective and non-destructive brake for a turbine responsive to loss of torque in the output shaft and to overspeed.

The nature of my invention and the advantages thereof will be clear to those skilled in the art from the succeeding detailed description of the preferred embodiment of the invention and the accompanying drawings thereof.

Figure 1:
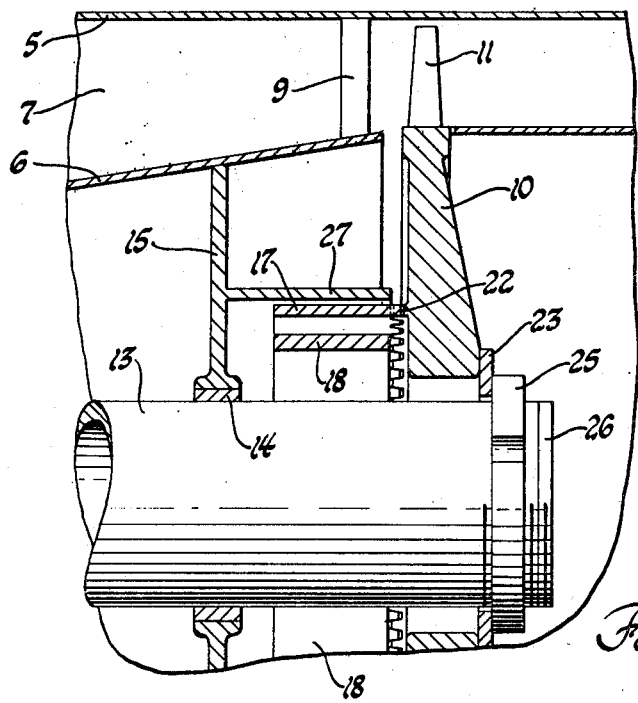
FIGURE 1 is an axial sectional view of a turbine illustrating the environment of my invention in somewhat schematic fashion, minimizing irrelevant detail.
Figure 2:
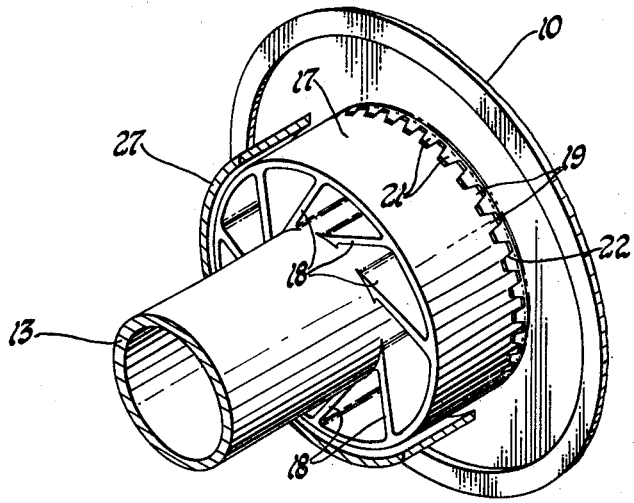
FIGURE 2 is an axonometric view, with parts cut away, of a turbine wheel, output shaft, and brake according to my invention.

Referring first to FIGURE 1, a turbine, which may be a single-stage turbine of a gas turbine engine, for example, embodies, as shown more or less schematically, an outer casing 5 and an inner casing 6, these defining between them an inlet 7 for motive fluid to the turbine. The turbine includes nozzle vanes 9 and a turbine wheel 10 bearing blades 11. Wheel 10, which may be considered as a power output member, is mounted on a hollow shaft 13 which is a power transmission member to deliver the output of the turbine to a compressor or any other driven device. The turbine shaft 13 is suitably supported for rotation by means including a bearing 14 mounted in a fixed support 15 forming part of the framework of the engine. The turbine wheel 10 is connected to the shaft 13 through a coupling including a rotating brake drum 17 and a number of inclined or more or less nearly tangent spokes 18. Spokes 18 are preferably rigidly connected to the shaft and drum and may, for example, be welded to the shaft and drum. The margin of the brake drum 17 bears splines 19 which cooperate with splines 21 on the face of the turbine wheel to define a face spline or radial spline connection 22 between the wheel and drum. The wheel is held in engagement with the splines by any suitable structure, here illustrated as a washer 23 and a spanner nut 25, the nut engaging a threaded end portion 26 of shaft 13.

A fixed brake drum or member 27 of cylindrical shape is fixed on the support 15 concentric with the rotating brake drum 17 and very slightly spaced from it.

In normal operation of the engine up to any speed at which it is intended to operate, the rotating brake drum 17 tends to grow slightly with increase in speed, due to the effect of centrifugal force on the annular brake member. It is also affected by the torque transmitted through spokes 18. Since these are tension members, each spoke exerts a radially inward component of force on the drum as a function of the torque transmitted. This tends, to a greater or lesser extent, to counteract the effect of centrifugal force on the drum. If for any reason the turbine overspeeds, the centrifugal force increases very considerably, tending to bring the rotating brake drum into contact with the fixed brake drum. Moreover, since such gross overspeed is only to be expected when there is a very substantial loss of the torque opposing rotation of the turbine, the loss of this torque, by minimizing or eliminating the torque and thereby the inward force component transmitted by the spokes to the drum, also tends to cause increase in the size of the drum.

The parameters of the structure can readily be computed so that, upon any combination of speed or torque which indicates the imminence of destructive overspeed of the turbine, the brake expands so that member 17 is in rubbing contact with the outer drum 27. This acts to brake and decelerate the turbine in the interval before normal motive build control or other normal control devices can act.

If desired, drum 17 may have a higher coefficient of thermal expansion than drum 27 so that the heat due to rubbing acts to further energize the brake and stall the rotor.

The detailed description of the preferred embodiment of the invention for the purpose of explaining the principles thereof is not to be considered as limiting or restricting the invention, since many modifications may be made by the exercise of skill in the art without departing from the scope of the invention.

I claim:

1. An engine comprising, in combination, a power output member normally rotative at high speed in operation of the engine; a rotatable power transmission member; a coupling between the said members comprising an annular rotating brake member coupled to the output member to be driven thereby and spokes connecting the brake member to the transmission member, the spokes being inclined from the radial direction so that normal torque transmitted from the brake member to the transmission member exerts a radially inward force component through each spoke on the brake member; and a fixed brake member disposed closely adjacent to the rotating brake member so as to be engaged by the rotating brake member upon a predetermined radial expansion of the rotating brake member in response to the sum of the effects of centrifugal force due to overspeed and decrease of the said force component due to diminution of transmitted torque.

2. An engine as recited in claim 1 in which the power output member is a turbine or is driven by a turbine.

3. An engine as recited in claim 1 in which the power output member is a turbine wheel, the output member is a shaft, and the coupling supports the turbine wheel from the shaft.

4. An engine as recited in claim 3 including a face spline connection between the rotating brake member and the turbine wheel.

5. An engine as recited in claim 1 in which the spokes are rigidly connected to the rotating brake member and the transmission member.

6. An engine as recited in claim 1 in which the rotating brake member expands to a greater extent in response generated by rubbing between the brake members than the fixed brake member.

7. An engine as recited in claim 1 including a face spline connection between the power output member and the rotating brake member.

References Cited

UNITED STATES PATENTS

| 1,600,346 | 9/1926 | MacMurchy. |
| 2,962,257 | 11/1960 | Allingham. |
| 2,966,333 | 12/1960 | Flanagan. |
| 3,271,005 | 9/1966 | Jones. |

FOREIGN PATENTS

| 197,021 | 4/1908 | Germany. |

EVERETTE A. POWELL, Jr., Primary Examiner

U.S Cl. X.R.

188—185

PO-1050
(5/69)

UNITED STATES PATENT OFFICE
CERTIFICATE OF CORRECTION

Patent No. 3,495,919     Dated February 17, 1970

Inventor(s) Henry S. McLimore

It is certified that error appears in the above-identified patent and that said Letters Patent are hereby corrected as shown below:

Column 4, line 12, after "response" insert -- to heat --.

SIGNED AND
SEALED
NOV. 17 1970

NOV. 17, 1970

(SEAL)
Attest:

Edward M. Fletcher, Jr.
Attesting Officer

WILLIAM E. SCHUYLER, JR.
Commissioner of Patents